United States Patent
Kam et al.

(10) Patent No.: US 7,746,856 B2
(45) Date of Patent: Jun. 29, 2010

(54) METHOD, APPARATUS AND SYSTEM FOR OPTIMIZING PACKET THROUGHPUT FOR CONTENT PROCESSING SYSTEMS ON CHIPS

(75) Inventors: Jin Ming Kam, Perak (MY); Siva Shankar Jayaratnam, Kuala Lumpur (MY)

(73) Assignee: Intel Corporation, Santa Clara, CA (US)

( * ) Notice: Subject to any disclaimer, the term of this patent is extended or adjusted under 35 U.S.C. 154(b) by 457 days.

(21) Appl. No.: 11/856,408

(22) Filed: Sep. 17, 2007

(65) Prior Publication Data

US 2009/0074002 A1    Mar. 19, 2009

(51) Int. Cl.
*H04L 12/56*    (2006.01)
*H04J 1/16*    (2006.01)
(52) U.S. Cl. .................. 370/389; 370/252; 370/412
(58) Field of Classification Search ................ 370/412, 370/389, 252
See application file for complete search history.

(56) References Cited

U.S. PATENT DOCUMENTS

2002/0091916 A1*   7/2002   Dowling ................. 712/228

OTHER PUBLICATIONS

Ram Huggahalli, et al., "Direct Cache Access for High Bandwidth Network I/O", Proceedings of the 32nd International Symposium on Computer Architecture (ISCA'05), 2005 IEEE (10 pages).

* cited by examiner

*Primary Examiner*—John Pezzlo
(74) *Attorney, Agent, or Firm*—Sharmini N. Green

(57) ABSTRACT

An apparatus and system provide an optimizing content processing throughput for systems on chips ("SoCs"). A Packet Processing Memory Controller Cache ("PPMCC") on an SoC according to an embodiment of the present invention may enable the SoC to store content packets within the SoC, thus eliminating the need to write to and read from external memory. Additionally, by utilizing Quality of Service ("QoS") tags for the content packets received by the SoC, PPMCC may enforce a unique caching policy which optimizing content processing. Finally, an Address Translation Lookup Table ("ATLT") on the SoC enables packet processing controllers on the SoC to route packets directly amongst themselves by identifying the source and destination of each content packet.

12 Claims, 3 Drawing Sheets

Optimized SoC
200

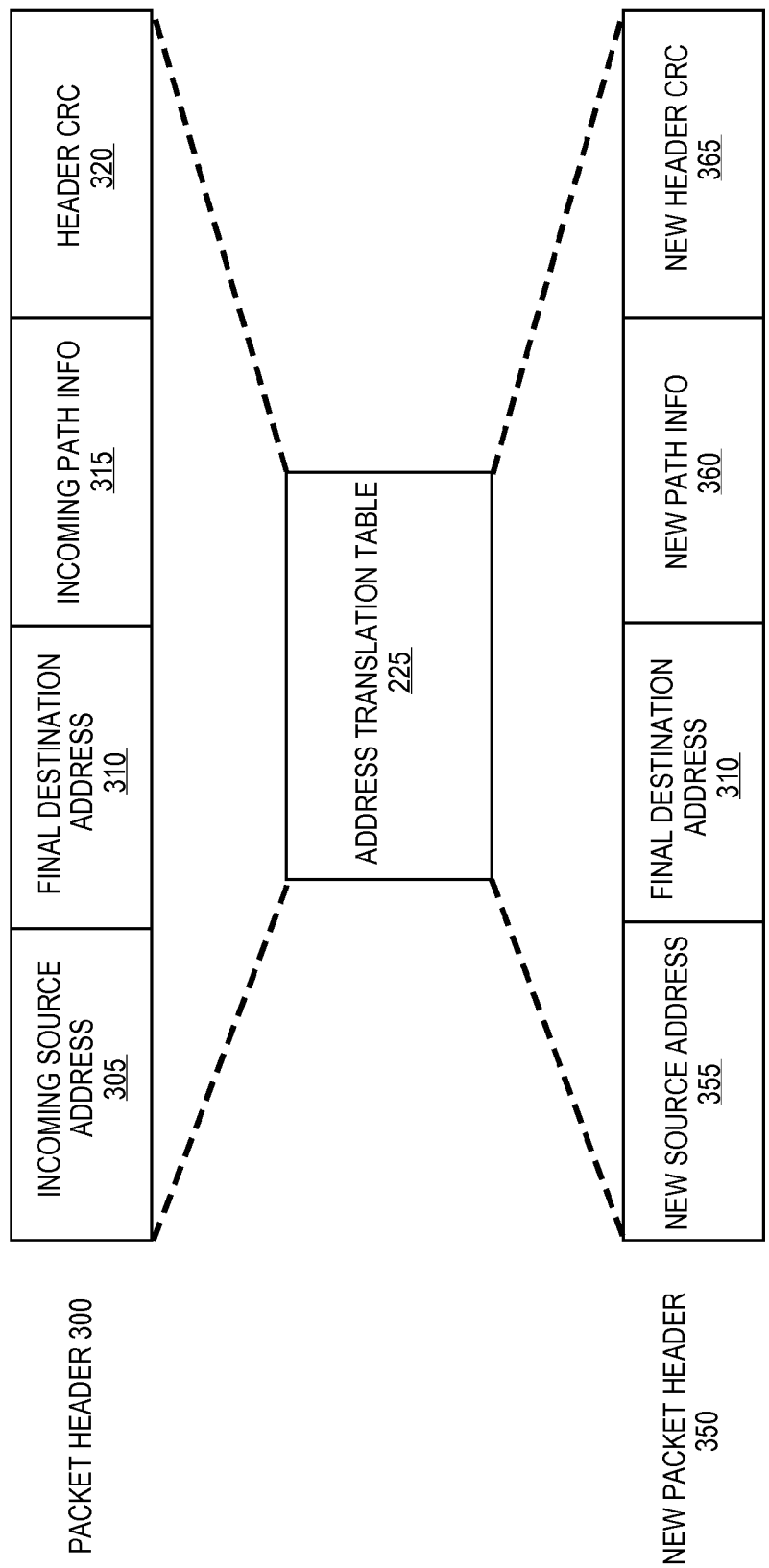

METHOD, APPARATUS AND SYSTEM FOR OPTIMIZING PACKET THROUGHPUT FOR CONTENT PROCESSING SYSTEMS ON CHIPS

BACKGROUND

In existing content processing System on Chip ("SoC") designs, the incoming content packets are typically directly redirected to external memory storage prior to being processed. As illustrated in FIG. 1, an existing content processing SoC ("SoC 100") may include two Packet Processing Controllers ("PPC 105" and "PPC 110"), a security accelerator ("SHA 115"), a central processing unit ("CPU 120") and a memory control unit ("MCU 125"), all coupled via a Central Communications Bus 150 to external memory ("External Memory 130). Examples of PPCs include Gigabit Ethernet controllers, PCI Express graphics adapters and USB controllers.

In a typical content processing scheme today, encrypted packets may be received by PPC 105, stored in External Memory 130, read and processed from External Memory 130 by CPU 120, stored back in External Memory 130, then read and retransmitted by PPC 110. If the incoming packet includes encryption, PPC 105 may again store the packets in External Memory 130, SHA 115 may read and decrypt the packets then store them back in External Memory 130 prior to CPU 120 reading and processing the packets. Again, CPU 120 may store the processed packets back in External Memory 130 and the packets may then be read and retransmitted by PPC 110.

Transferring packets this way imposes significant performance bottlenecks on SoC 100. Each data store and fetch to External Memory 130 has a fixed latency that is typically governed by industry standards and cannot easily be changed. External Memory 130 may, for example, be double data rate ("DDR") memory, governed by well-known DDR standards. As the number of PPCs in the system increases, the performance bottleneck becomes more pronounced.

BRIEF DESCRIPTION OF THE DRAWINGS

The present invention is illustrated by way of example and not limitation in the figures of the accompanying drawings in which like references indicate similar elements, and in which:

FIG. 3 illustrates a content packet header converter table according to an embodiment of the present invention.

DETAILED DESCRIPTION

Embodiments of the present invention provide an optimizing content processing throughput for systems on chips ("SoCs"). As used herein, SoCs may include, but are not limited to, internet network controller devices, image capture devices for digital cameras and/or video on demand processors for set-top-boxes. Additionally, content packets may include, but are not limited to, streaming video from the internet and/or audio data through a Universal Serial Bus ("USB") connection. Reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

Figure 1:
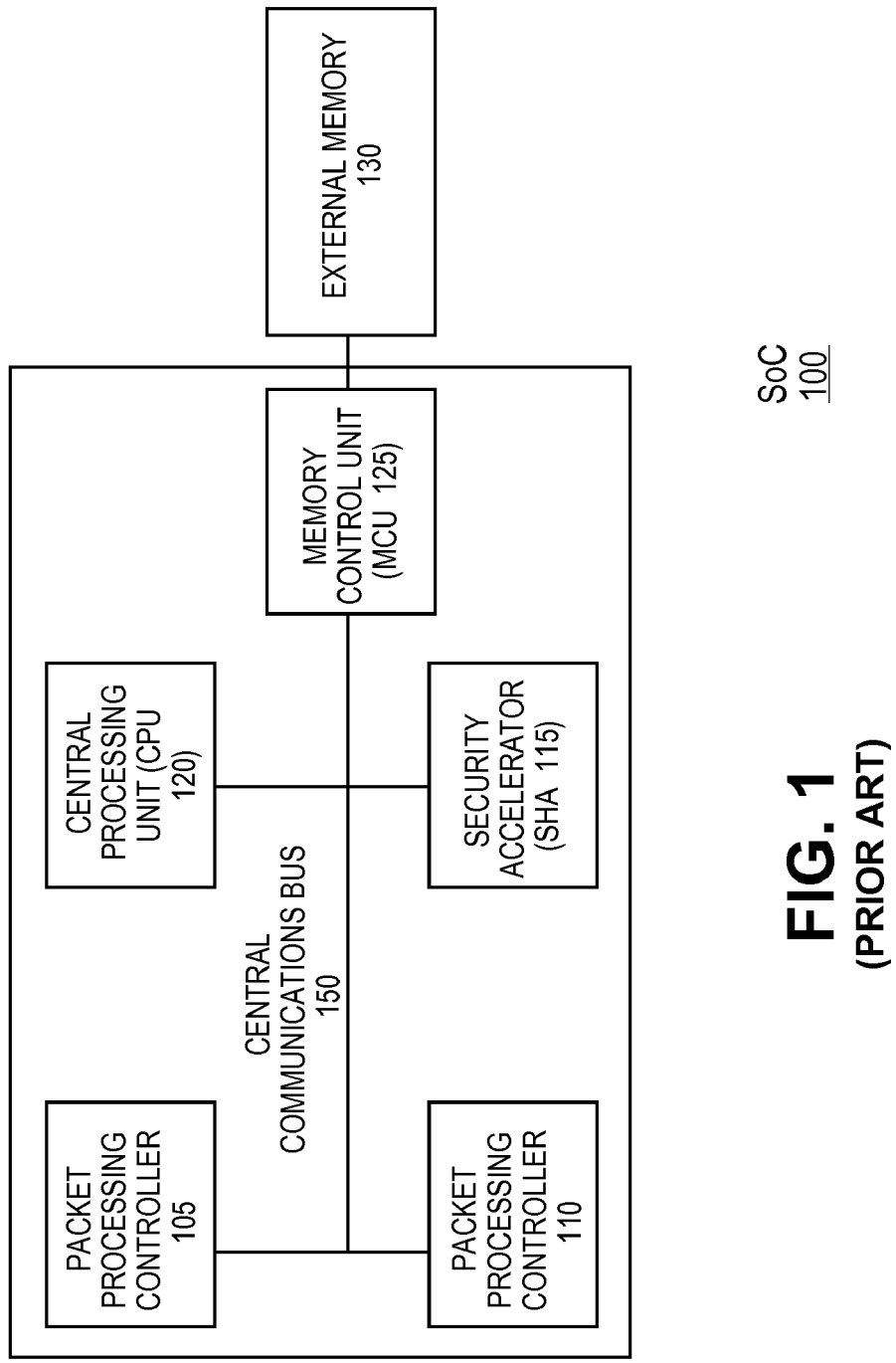
FIG. 1 illustrates an existing System on Chip ("SoC") content processing system.
Figure 2:
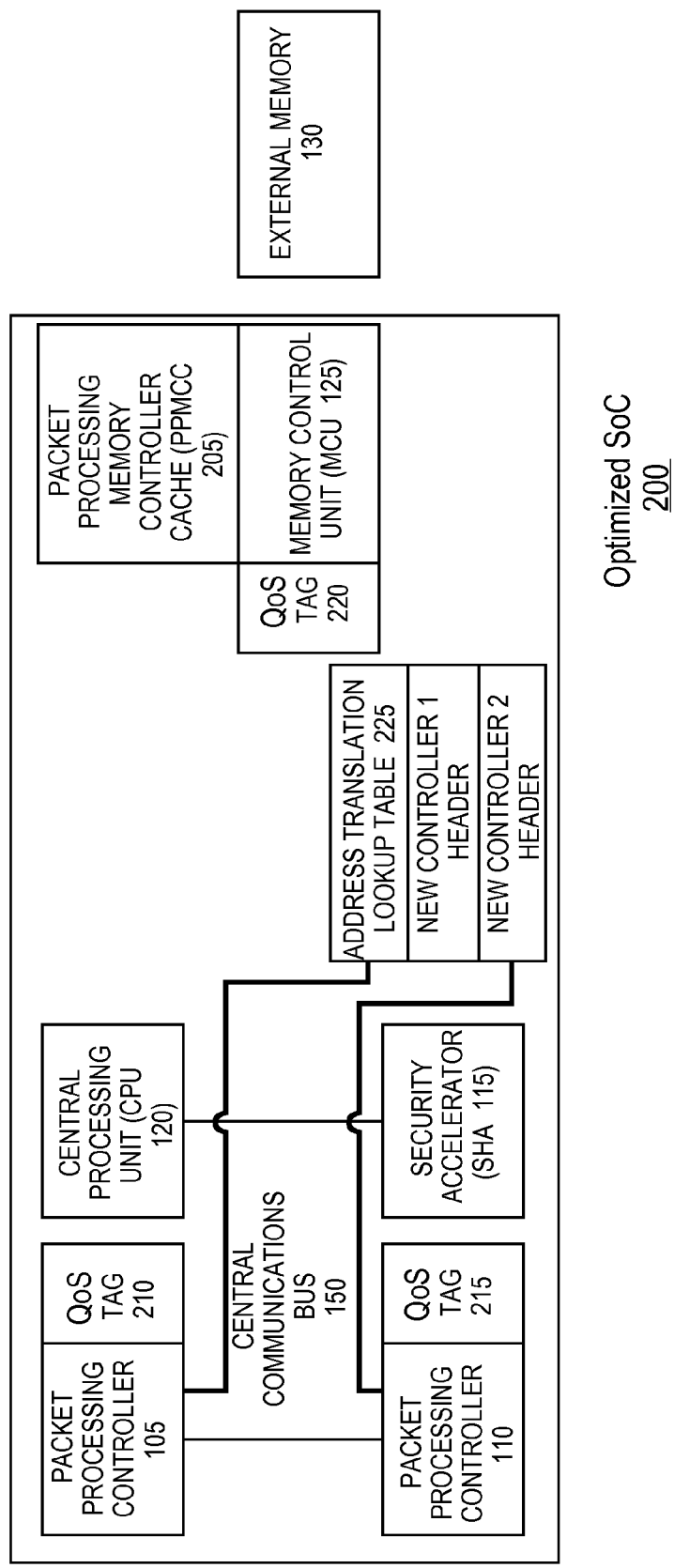
FIG. 2 illustrates an embodiment of the present invention.

Embodiments of the present invention optimize content processing for SoCs by enabling higher data throughput rates. FIG. 2 illustrates an optimized content processing SoC according to an embodiment of the present invention. As illustrated, the optimized content processing SoC ("Optimized SoC 200") may include all the elements of existing content processing SoCs (e.g., SoC 100 as illustrated in FIG. 1). Additionally, however, according to an embodiment of the invention, Optimized SoC 200 may also include a Packet Processing Memory Controller Cache ("PPMCC 205"), Quality of Service ("QoS") tags (illustrated as "QoS Tag 210", "QoS Tag 215" and "QoS Tag 220") and Address Translation Lookup Table ("ATLT 225"). In embodiments of the invention, these additional elements of Optimized SoC 200 enable enhanced and optimized content processing on SoC 200 as described in further detail below.

In one embodiment, PPMCC 205 may reside in MCU 125. In alternate embodiments, PPMCC 205 may comprise a separate component residing within SoC 200 and coupled to MCU 125. PPMCC 205 may be utilized to eliminate the read latency from External Memory 130. Specifically, in one embodiment, incoming content packets may be stored in PPMCC 205 as well as External Memory 130 (hereafter referred to as a "Write Through" policy). CPU 125 may thereafter retrieve the content packets from PPMCC 205 instead of External Memory 130 for processing, thus eliminating the need to access the packets from External Memory 130. With the addition of PPMCC 205, packet latency through Optimized SoC 200 may be significantly reduced (in some instances reduced by half) as the need to wait for the data from External Memory 130 is eliminated.

Additionally, by utilizing a unique caching policy, in one embodiment, the read operation from PPMCC 205 may invalidate the cached packets (hereafter referred to as a "Read Clear" policy). A timer controlled "least recently used" mechanism may also be utilized to allow cache locations to be recycled by new packets if reads have not occurred. This "Read Clear" policy for PPMCC 205 is unique as compared to other caching policies as caches are typically optimized for general data wherein the most recently used data is typically stored in the cache. In one embodiment of the invention, the packets stored in PMMCC 205 may also be assigned a priority and the replacement policy for PPMCC 205 may take into the consideration the priority of the packet. The higher the priority of the packet, the least likely it is to be replaced compared a lower priority packet. Thus, in one embodiment, by utilizing the "Write Through" and "Read Clear" policies in conjunction with prioritized packets, the chances are significant that the data to be retrieved resides within PPMCC 205, i.e., within Optimized SoC 200, thus eliminating the delay associated with fetching the data from External Memory 130.

In yet another embodiment of the invention, PPMCC 205 may be further optimized to dynamically partition itself to dedicate different amount of space for different functional blocks. Thus, for example, blocks with higher throughput and requiring faster bandwidth, may be allocated more cache space. Quality of Service tags 210, 215 and/or 220 (collectively "QoS tags") maybe utilized to identify the blocks having higher throughput and requiring faster bandwidth. In one embodiment, QoS tag information may be appended to incoming packets and the QoS information derived from these incoming packet headers may be utilized by PPMCC 205. QoS information that may be extracted from these tags include payload size, packet priority, resent packets and even data response request packets. In the case of data response request packets, the QoS tag may be used by PPMCC 205 to pre-allocate the size of the cache elements to be dedicated for the data payload and also to pre-fetch data from the external memory up-front. In one embodiment, use of these QoS tags results in a shorter latency between data requests and responses, thus improving performance on SoC 200.

In one embodiment of the invention, to further improve performance of Optimized SoC 200, ATLT 225 may be utilized. ATLT 225 may maintain a listing of all the source and/or destination addresses of the packets for each of the PPCs on Optimized SoC 200. Since a significant portion of time spent forwarding a packet is spent identifying and changing the source and/or destination information of the header, ATLT 225 enables the data payload received from the source (PPC 105) to be directly passed to the destination (PPC 110) for transmission. This "short circuiting" of packet routing provides a significant performance improvement for Optimized SoC 200.

FIG. 3 illustrates a content packet header converter table according to an embodiment of the present invention. Specifically, FIG. 3 illustrates an example of how the address translation table converts the header of a packet arriving at PPC 105 to a header for PPC 110 as the source for packet forwarding. This type of "peer-to-peer" transmission scheme may significantly improve performance on Optimized SoC 200 because it eliminates the need for CPU 120 to process the packets. As illustrated, example packet header ("Packet Header 300") may include an incoming source address ("Incoming Source Address 305"), a final destination address ("Final Destination Address 310"), incoming path information ("Incoming Path Info 315") and header cyclic redundancy check information for Packet Header 300 ("Header CRC 320"). Utilizing ATLT 225, Packet Header 300 may be converted into a new packet header ("New Packet Header 350"). Translated Packet Header 350 may include the same Final Destination Address 310, but the source address may be changed to PPC 110's address ("New Source Address 355") while Incoming Path info 315 becomes new path information from PPC 310 to Final Destination Address 310 ("New Path Info 360"). As a result of the changes, the CRC information for the new header also changes to "New Header CRC 365").

The same data payload can now be routed through SHA 115 for encryption prior to retransmission and/or storage onto External Memory 130, if desired. In one embodiment, if the data is to be stored in External Memory 130, having only encrypted data stored greatly enhance system security as intruders cannot probe the physical pins of Optimized SoC 200 to capture the data. Embodiments of the invention also enhance the design's capabilities to handle digital rights management ("DRM") when dealing with movies streamed over the internet.

The SoCs according to embodiments of the present invention may be implemented on a variety of computing devices. According to an embodiment, a computing device may include various other well-known components such as one or more processors which can be specialized RISC engines or general purpose processing engines. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. In alternate embodiments, the host bus controller may be compatible with various other interconnect standards including Ethernet, Gigabit Ethernet, PCI, PCI Express, FireWire and other such existing and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system, comprising:
a first packet processing controller;
a second packet processing controller coupled to the first packet processing controller;
a memory cache controller coupled to the first packet processing controller and second packet processing controller;
a memory control unit coupled to the memory cache controller, the memory cache controller capable of storing content packets received by the first packet processing controller and the second packet processing controller, the memory cache controller including a unique cache policy; and
a quality of service tag coupled to each of the content packets, the quality of service tag including information about each of the content packets.

2. The system according to claim 1 further comprising at least one address translation lookup table, the address translation lookup table capable of enabling peer to peer communication between the first packet processing controller and the second packet processing controller by translating addresses of the content packets to directly route the content packets from the first packet processing controller to the second packet processing controller.

3. The system according to claim 1 further comprising an external memory coupled to the first packet processing controller, the second packet processing controller and the memory control unit.

4. The system according to claim 3 wherein the content packets received by the first packet processing controller and the second packet processing controller are stored in the memory control cache unit and the external memory.

5. The system according to claim 1 wherein the unique cache policy assigns the content packets received by the first packet processing controller and the second packet processing controller a priority based on the quality of service tags.

6. The system according to claim 5 wherein the unique cache policy additionally identifies memory locations of the memory packets in the memory cache controller that are least recently used and enables the memory control unit to recycle the memory locations with newly received content packets.

7. A method, comprising:
receiving content packets on a first packet processing controller and a second content processing controller on a computing system;
reading quality of service tags associated with the content packets; and storing content packets received by the first packet processing controller and the second packet processing controller in a memory cache controller coupled to the memory control unit, the cache controller utilizing the quality of service tags as part of a unique cache policy.

8. The method according to claim 7 further comprising the memory cache controller coupled to the memory control unit utilizing an address translation lookup table to directly route the content packets from the first packet processing controller to the second packet processing controller.

9. The method according to claim 7 wherein the content packets received by the first packet processing controller and the second packet processing controller are stored in the memory control cache unit and an external memory.

10. The method according to claim 7 further comprising utilizing the quality of service tags to assign the content packets received by the first packet processing controller and the second packet processing controller a priority.

11. The method according to claim 10 further comprising identifying memory locations of the memory packets in the memory cache controller that are least recently used and enabling the memory control unit to recycle the memory locations with newly received content packets.

12. The method according to claim 7 further comprising enabling peer to peer communication between the first packet processing controller and the second packet processing controller by utilizing the address translation lookup table to directly route the content packets from the first packet processing controller to the second packet processing controller.

* * * * *